United States Patent
Yang

(10) Patent No.: US 9,543,797 B2
(45) Date of Patent: Jan. 10, 2017

(54) CROSS-INTERLOCKED SWITCH TYPE DC ELECTRIC MACHINE HAVING AUXILIARY EXCITATION WINDING AND CONDUCTION RING AND BRUSH

(71) Applicant: Tai-Her Yang, Dzan-Hwa (TW)

(72) Inventor: Tai-Her Yang, Dzan-Hwa (TW)

(*) Notice: Subject to any disclaimer, the term of this patent is extended or adjusted under 35 U.S.C. 154(b) by 599 days.

(21) Appl. No.: 13/914,877

(22) Filed: Jun. 11, 2013

(65) Prior Publication Data

US 2013/0328457 A1 Dec. 12, 2013

Related U.S. Application Data

(63) Continuation-in-part of application No. 13/836,526, filed on Mar. 15, 2013, now Pat. No. 9,178,396, which is a continuation-in-part of application No. 13/493,157, filed on Jun. 11, 2012, now Pat. No. 9,000,649.

(51) Int. Cl.

| | |
|---|---|
| *H02K 3/28* | (2006.01) |
| *H02K 11/00* | (2016.01) |
| *H02K 19/38* | (2006.01) |
| *H02P 5/685* | (2006.01) |
| *H02P 7/282* | (2016.01) |

(52) U.S. Cl.
CPC ............... *H02K 3/28* (2013.01); *H02P 5/685* (2013.01); *H02P 7/282* (2013.01)

(58) Field of Classification Search
CPC .......... H02K 3/28; H02K 16/00; H02K 19/12; H02K 21/042; H02P 5/685; H02P 7/282; H02P 7/06

USPC ................................ 310/68 B, 180, 181, 112
See application file for complete search history.

(56) References Cited

U.S. PATENT DOCUMENTS

| | | | | | |
|---|---|---|---|---|---|
| 1,646,821 | A | * | 10/1927 | Karapetoff | H02P 9/105 310/133 |
| 2,437,996 | A | * | 3/1948 | Carnegie | B66C 13/26 318/382 |
| 2,977,518 | A | * | 3/1961 | Kafka et al. | H02M 5/04 307/149 |
| 3,675,099 | A | * | 7/1972 | Johnston | H02P 23/08 318/378 |
| 3,750,000 | A | * | 7/1973 | Bruckner | H02P 8/32 318/400.09 |
| 3,831,075 | A | * | 8/1974 | Liska | G05D 3/183 318/596 |
| 3,883,633 | A | * | 5/1975 | Kohler | H02K 57/006 310/138 |

(Continued)

*Primary Examiner* — Alex W Mok
(74) *Attorney, Agent, or Firm* — Bacon & Thomas, PLLC

(57) ABSTRACT

The present invention relates to a multi-set switched DC electric machine having conduction ring and brush and having its rotary part of electric machine being installed with an auxiliary excitation winding set, which is served to be driven by the DC power source or by the DC power source rectified from the AC power source, for being connected in series with a magnetic field winding set of electric machine of another electric machine through the auxiliary excitation winding set installed on the rotary part of electric machine, such that the excitation can be variable through altering the current of the magnetic field winding set of electric machine of the another electric machine thereby changing the operational characteristic of the electric machine.

7 Claims, 4 Drawing Sheets

(56) References Cited

U.S. PATENT DOCUMENTS

| | | | | | |
|---|---|---|---|---|---|
| 4,260,944 A * | 4/1981 | O'Mahony | H02K 16/02 310/111 |
| 4,412,794 A * | 11/1983 | Presley | H02K 41/06 310/82 |
| 4,532,458 A * | 7/1985 | Kuznetsov | H02P 5/74 318/111 |
| 4,577,139 A * | 3/1986 | Reinhardt | H02K 29/08 310/181 |
| 4,786,853 A * | 11/1988 | VanMaaren | H02P 9/46 322/47 |
| 4,959,605 A * | 9/1990 | Vaidya | H02K 16/00 310/156.08 |
| 5,179,308 A * | 1/1993 | Malsky | F16C 32/0459 310/90.5 |
| 5,915,070 A * | 6/1999 | Takekawa | H02P 27/08 318/440 |
| 6,278,211 B1 * | 8/2001 | Sweo | H02K 16/00 310/114 |
| 6,373,204 B1 * | 4/2002 | Peterson | H02P 5/74 318/112 |
| 7,250,734 B1 * | 7/2007 | Iannello | H02K 19/103 310/168 |
| 7,859,200 B2 * | 12/2010 | Yang | H02K 17/36 310/195 |
| 7,915,778 B2 * | 3/2011 | Miyata | H02K 3/28 310/179 |
| 2002/0117934 A1 * | 8/2002 | Kanazawa | H02K 21/044 310/263 |
| 2002/0117935 A1 * | 8/2002 | Kanazawa | H02K 7/116 310/263 |
| 2006/0097670 A1 * | 5/2006 | Fukasaku | B60K 6/26 318/105 |
| 2009/0096310 A1 * | 4/2009 | Takeuchi | H02K 15/026 310/156.36 |
| 2010/0019701 A1 * | 1/2010 | Yang | H02K 17/36 318/49 |
| 2010/0148717 A1 * | 6/2010 | Yang | H02P 25/16 318/767 |
| 2012/0134856 A1 * | 5/2012 | Wu | F04D 19/002 417/350 |
| 2013/0328456 A1 * | 12/2013 | Yang | H02P 5/685 310/68 B |
| 2013/0328518 A1 * | 12/2013 | Yang | H02K 21/042 318/716 |

\* cited by examiner

CROSS-INTERLOCKED SWITCH TYPE DC ELECTRIC MACHINE HAVING AUXILIARY EXCITATION WINDING AND CONDUCTION RING AND BRUSH

CROSS REFERENCE TO RELATED APPLICATION

This is a continuation-in part of application Ser. No. 13/836,526 filed on Mar. 15, 2013 which is a continuation-in part of application Ser. No. 13/493,157 filed on Jun. 11, 2012.

BACKGROUND OF THE INVENTION (a) Field of the Invention

The present invention relates to a multi-set switched DC electric machine having conduction ring and brush, driven by the DC power source or by the DC power source rectified from the AC power source, and having the rotary part of magnetic force actuated electric machine being installed with an auxiliary excitation winding set, for being connected in series with a magnetic field winding set of electric machine of another electric machine through the auxiliary excitation winding set installed on the rotary part of magnetic force actuated electric machine, such that the excitation can be variable through altering the current of the magnetic field winding set of electric machine of the another electric machine thereby changing the operational characteristic of the electric machine.

(b) Description of the Prior Art

A conventional switched DC electric machine having conduction ring and brush, e.g. a switched electric machine having conduction ring and brush and having permanent magnetic pole or having reluctance rotor, often utilizes a Hall element for sensing locations so as to determine the switch timing, or utilizes an open loop means for allowing the magnetic field winding set to generate sequential excitation for driving the rotary part, so that there is a shortage of the mentioned structure that each switched DC electric machine having conduction ring and brush requires an individual electromechanical control unit.

SUMMARY OF THE INVENTION

The present invention relates to a multi-set switched DC electric machine having conduction ring and brush, driven by the DC power source or by the DC power source rectified from the AC power source, and having the rotary part of magnetic force actuated electric machine being installed with an auxiliary excitation winding set, for being connected in series with a magnetic field winding set of electric machine of another electric machine through the auxiliary excitation winding set installed on the rotary part of magnetic force actuated electric machine, such that the excitation can be variable through altering the current of the magnetic field winding set of electric machine of the another electric machine thereby changing the operational characteristic of the electric machine.

DESCRIPTION OF MAIN COMPONENT SYMBOLS

Figure 1:
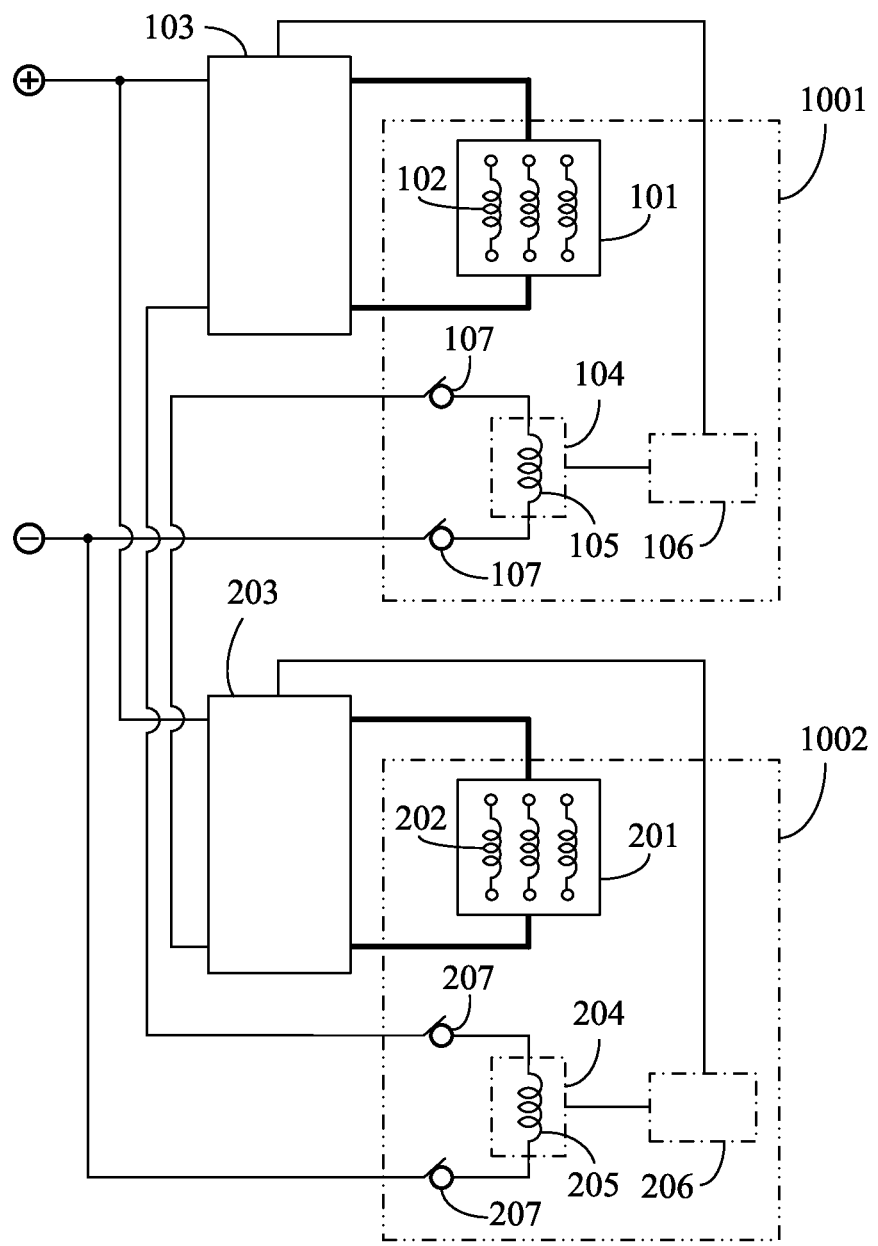
FIG. 1 is a schematic block diagram illustrating the cross-interlocked switch type DC electric machine system having conduction ring and brush being installed with the first serial type auxiliary excitation winding set (105) and the second serial type auxiliary excitation winding set (205), according to the present invention.

101: First magnetic field structure of electric machine
1001: First switched DC electric machine having conduction ring and brush
1002: Second switched DC electric machine having conduction ring and brush
102: First magnetic field winding set of electric machine
103: First drive control device
104: First rotary part of electric machine
105: First serial type auxiliary excitation winding set
106: First electric machine angular position sensor
107: First electric conduction ring and brush device
108: First parallel type auxiliary excitation winding set
201: Second magnetic field structure of electric machine
202: Second magnetic field winding set of electric machine
203: Second drive control device
204: Second rotary part of electric machine
205: Second serial type auxiliary excitation winding set
206: Second electric machine angular position sensor
207: Second electric conduction ring and brush device
208: Second parallel type auxiliary excitation winding set
301: Permanent magnetic pole of first rotary part of electric machine
305: First serial type regulating excitation winding set
401: Permanent magnetic pole of second rotary part of electric machine
405: Second serial type regulating excitation winding set

DETAILED DESCRIPTION OF THE PREFERRED EMBODIMENTS

The present invention relates to a multi-set switched DC electric machine having conduction ring and brush, driven by the DC power source or by the DC power source rectified from the AC power source, having the rotary part of magnetic force actuated electric machine being installed with an auxiliary excitation winding set, for being connected in series with a magnetic field winding set of electric machine of another electric machine through the auxiliary excitation winding set installed on the rotary part of magnetic force actuated electric machine, such that the excitation can be variable through altering the current of the magnetic field winding set of electric machine of the another electric machine.

FIG. 1 is a schematic block diagram illustrating the cross-interlocked switched DC electric machine system having conduction ring and brush being installed with the first serial type auxiliary excitation winding set (105) and the second serial type auxiliary excitation winding set (205), according to the present invention;

As shown in FIG. 1, it mainly consists of:

first drive control device (103): constituted by a drive electric control device composed of electromechanical components and/or solid state components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft, and the coupling surface of the first rotary part of electric machine (104) and the first magnetic field structure of electric machine (101) being provided with a salient pole structure having magnetic conductive feature and having the magnetic poles with the quantity same as or different from that of the first magnetic field structure of electric machine (101), the characteristic is that the magnetic pole of the first rotary part of electric machine (104) being installed with the first serial type auxiliary excitation winding set (105) thereby transmitting the excitation electric power between the mentioned winding set and the exterior through the first electric conduction ring and brush device (107);

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means includes installing the first serial type auxiliary excitation winding set (105), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source;

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid state components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator;

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second magnetic field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft, and the coupling surface of the second rotary part of electric machine (204) and the second magnetic field structure of electric machine (201) being provided with a salient pole structure having magnetic conductive feature and having the magnetic poles with the quantity same as or different from that of the second magnetic field structure of electric machine (201), the characteristic is that the magnetic pole of the second rotary part of electric machine (204) being installed with the second serial type auxiliary excitation winding set (205) thereby transmitting the excitation electric power between the mentioned winding set and the exterior through the second electric conduction ring and brush device (207);

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source;

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and the exterior;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

Figure 2:
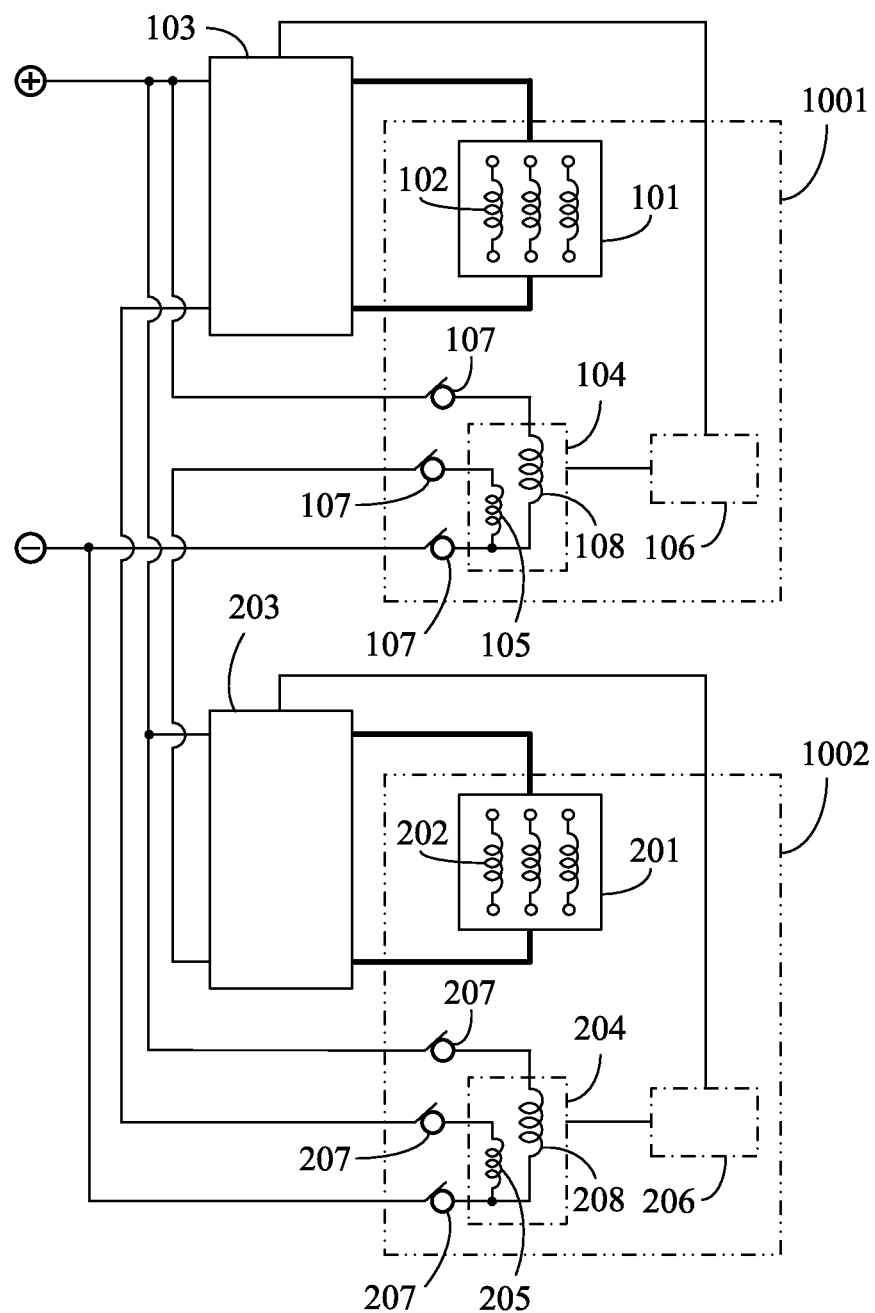
FIG. 2 is a schematic block diagram illustrating the cross-interlocked switch type DC electric machine system having conduction ring and brush being installed with the first serial type auxiliary excitation winding set (105), the second serial type auxiliary excitation winding set (205), the first parallel type auxiliary excitation winding set (108) and the second parallel type auxiliary excitation winding set (208), according to the present invention.

FIG. 2 is a schematic block diagram illustrating the cross-interlocked switched DC electric machine system having conduction ring and brush being installed with the first serial type auxiliary excitation winding set (105), the second serial type auxiliary excitation winding set (205), the first parallel type auxiliary excitation winding set (108) and the second parallel type auxiliary excitation winding set (208), according to the present invention;

As shown in FIG. 2, it mainly consists of:

first drive control device (103): constituted by a drive electric control device composed of electromechanical components and/or solid state components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator; and controlling the voltage, the current and the polarity of excitation electric power passing the first parallel type auxiliary excitation winding set (108);

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft, and the coupling surface of the first rotary part of electric machine (104) and the first magnetic field structure of electric machine (101) being provided with a salient pole structure having magnetic conductive feature and having the magnetic poles with the quantity same as or different from that of the first magnetic field structure of electric machine (101), the characteristic is that the magnetic pole of the first rotary part of electric machine (104) being installed with the first serial type auxiliary excitation winding set (105) thereby transmitting the excitation electric power between the mentioned winding set and the exterior through the first electric conduction ring and brush device (107);

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means include installing one or both of the first serial type auxiliary excitation winding set (105) and the first parallel type auxiliary excitation winding set (108), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source; the first parallel type auxiliary excitation winding set (108) is connected in parallel with the DC power source or the output end of the first drive control device (103) or two ends of the first magnetic field winding set of electric machine (102);

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and/or the first parallel type auxiliary excitation winding set (108) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid state components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator; and controlling the voltage, the current and the polarity of the excitation electric power passing the second parallel type auxiliary excitation winding set (208);

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft, and the coupling surface of the second rotary part of electric machine (204) and the second magnetic field structure of electric machine (201) being provided with a salient pole structure having magnetic conductive feature and having the magnetic poles with the quantity same as or different from that of the second magnetic field structure of electric machine (201), or having permanent magnetic pole and having the magnetic poles with the quantity same as or different from that of the second magnetic field structure of electric machine (201), the characteristic is that the magnetic pole of the second rotary part of electric machine (204) being installed with the second serial type auxiliary excitation winding set (205) thereby transmitting the excitation electric power between the mentioned winding set and the exterior through the second electric conduction ring and brush device (207);

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205) or the second parallel type auxiliary excitation winding set (208), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source; the second parallel type auxiliary excitation winding set (208) is connected in parallel with the DC power source or the output end of the second drive control device (203) or two ends of the second magnetic field winding set of electric machine (202);

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and/or the second parallel type auxiliary excitation winding set (208) and the exterior;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

Figure 3:
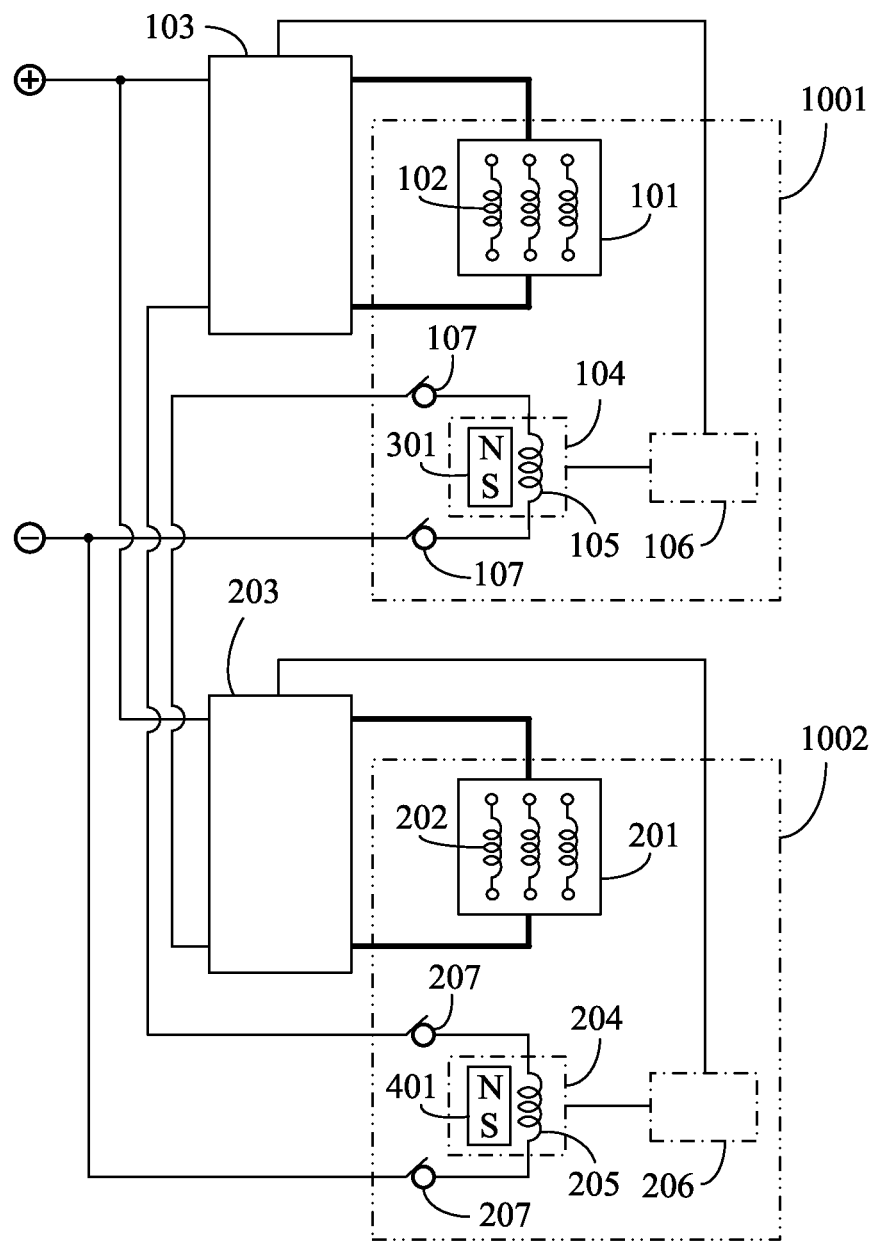
FIG. 3 is a schematic block diagram illustrating the cross-interlocked multi-phase switched DC electric machine system having conduction ring and brush being installed with the first serial type auxiliary excitation winding set (105), the permanent magnetic pole of first rotary part of electric machine (301), the second serial type auxiliary excitation winding set (205) and the permanent magnetic pole of second rotary part of electric machine (401), according to the present invention.

FIG. 3 is a schematic block diagram illustrating the cross-interlocked multi-phase switched DC electric machine system having conduction ring and brush being installed with the first serial type auxiliary excitation winding set (105), the permanent magnetic pole of first rotary part of electric machine (301), the second serial type auxiliary excitation winding set (205) and the permanent magnetic pole of second rotary part of electric machine (401), according to the present invention;

As shown in FIG. 3, it mainly consists of:

first drive control device (103): constituted by a drive electric control device composed of electromechanical components and/or solid state components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft, and the coupling surface of the first rotary part of electric machine (104) and the first magnetic field structure of electric machine (101) being provided with a salient pole structure having magnetic conductive feature and having the magnetic poles with the quantity same as or different from that of the first magnetic field structure of electric machine (101), and provided with the permanent magnetic pole of first rotary part of electric machine (301) having the magnetic poles with the quantity same as or different from that of the first magnetic field structure of electric machine (101), the characteristic is that the magnetic pole of the first rotary part of electric machine (104) being installed with the first serial type auxiliary excitation winding set (105) thereby transmitting the excitation electric power between the mentioned winding set and the exterior through the first electric conduction ring and brush device (107); the first serial type auxiliary excitation winding set (105) and the permanent magnetic pole of first rotary part of electric machine (301) include being installed at the same polarity for auxiliary excitation or at different polarity for differential excitation;

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means includes installing the first serial type auxiliary excitation winding set (105), wherein the first serial type auxiliary excitation winding set (105) is through the output end of the first electric conduction ring and brush device (107) for being connected in series with the electric power input end of the second drive control device (203) of the second magnetic field winding set of electric machine (202) then leaded to the DC power source;

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid state components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator;

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second magnetic field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft, and the coupling surface of the second rotary part of electric machine (204) and the second magnetic field structure of electric machine (201) being provided with a salient pole structure having magnetic conductive feature and having the magnetic poles with the quantity same as or different from that of the second magnetic field structure of electric machine (201), and provided with the permanent magnetic pole of second rotary part of electric machine (401) having the magnetic poles with the quantity same as or different from that of the second magnetic field structure of electric machine (201), the characteristic is that the magnetic pole of the second rotary part of electric machine (204) being installed with the second serial type auxiliary excitation winding set (205) thereby transmitting the excitation electric power between the mentioned winding set and the exterior through the second electric conduction ring and brush device (207); the second serial type auxiliary excitation winding set (205) and the permanent magnetic pole of second rotary part of electric machine (401) include being installed at the same polarity for auxiliary excitation or at different polarity for differential excitation;

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205), wherein the second serial type auxiliary excitation winding set (205) is through the output end of the second electric conduction ring and brush device (207) for being connected in series with the electric power input end of the first drive control device (103) of the first magnetic field winding set of electric machine (102) then leaded to the DC power source;

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and the exterior;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

Figure 4:
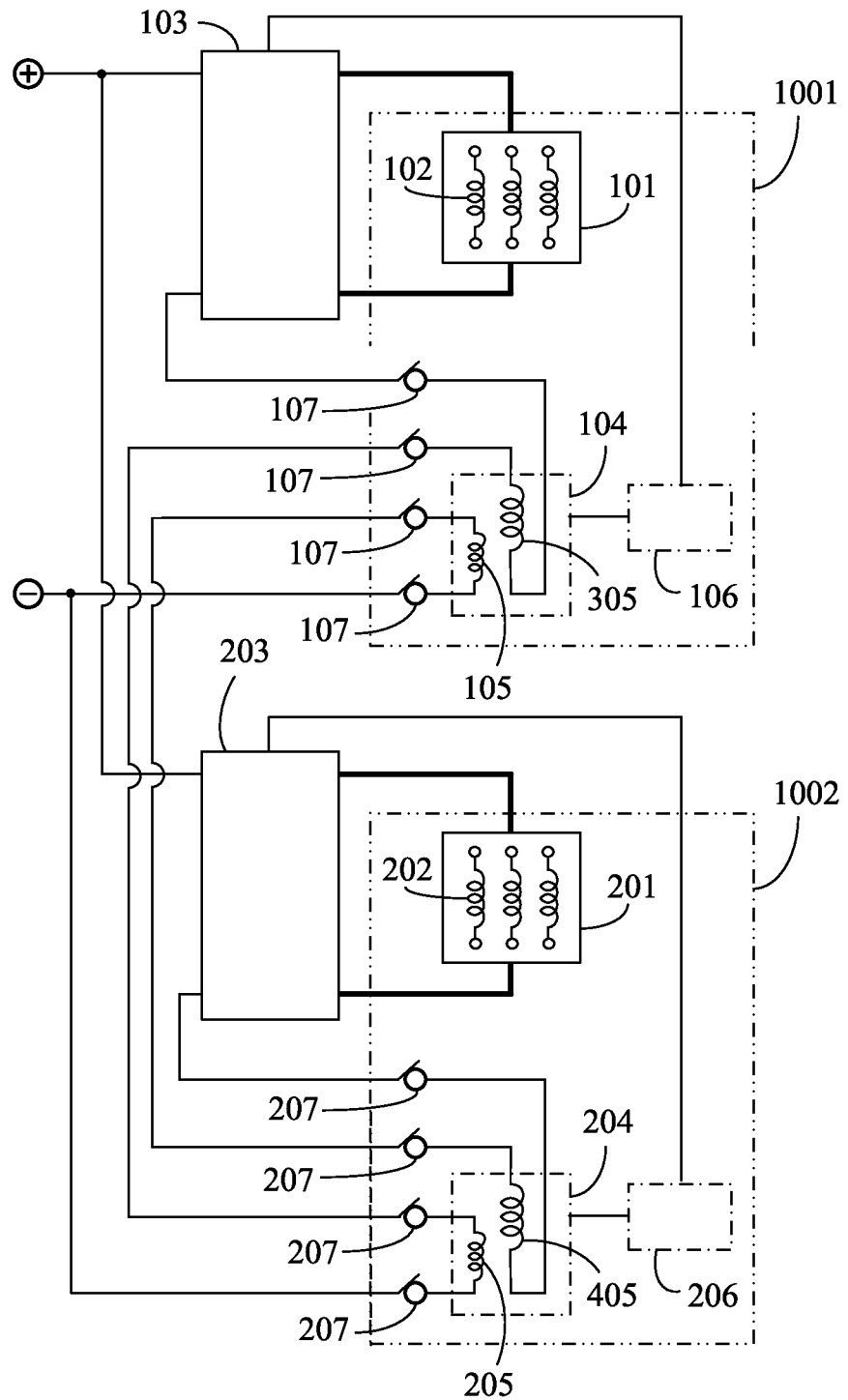
FIG. 4 is a schematic block diagram illustrating the semi cross-interlocked multi-phase switched DC electric machine system having conduction ring and brush being installed with the first serial type auxiliary excitation winding set (105), the first serial type regulating excitation winding set (305), the second serial type auxiliary excitation winding set (205) and the second serial type regulating excitation winding set (405), according to the present invention.

FIG. 4 is a schematic block diagram illustrating the semi cross-interlocked multi-phase switched DC electric machine system having conduction ring and brush being installed with the first serial type auxiliary excitation winding set (105), the first serial type regulating excitation winding set (305), the second serial type auxiliary excitation winding set (205) and the second serial type regulating excitation winding set (405), according to the present invention;

As shown in FIG. 4, it mainly consists of:

first drive control device (103): constituted by a drive electric control device composed of electromechanical components and/or solid state components and/or microprocessors, served to receive signals from the first electric machine angular position sensor (106), for controlling the timing, the polarity, the phase sequence and the value of voltage and current of the power supply excitation while the first magnetic field winding set of electric machine (102) being operated as a motor, or controlling the timing, the polarity, the phase sequence and the value of voltage and current of outputting electric power while being operated as a power generator;

first magnetic field structure of electric machine (101): constituted by magnetic conductive iron cores and installed with the first magnetic field winding set of electric machine (102) having two or more phases, coupled to the first rotary part of electric machine (104), the magnetic loop formed by the first magnetic field structure of electric machine (101) and the first rotary part of electric machine (104) allows the shifting magnetic field of the first magnetic field winding set of electric machine (102) to pass, thereby generating the electromechanical effect between the first magnetic field structure of electric machine (101) and the first rotary part of electric machine (104);

first magnetic field winding set of electric machine (102): constituted by a winding set installed in the first magnetic field structure of electric machine (101) having two or more phases; controlled by the excitation control of the first drive control device (103) while being operated as a motor, thereby generating shifting magnetic fields, and generating a motor actuation effect with the first rotary part of electric machine (104); while being operated as a power generator, the first magnetic field winding set of electric machine (102) is controlled by the first drive control device (103) thereby controlling the voltage and current of outputting electric power;

first electric machine angular position sensor (106): constituted by an electromechanical type switch, a Hall element or a physical location sensor such as photoelectron or electromagnetic induction, or ultrasonic or electrostatic induction; installed between the first magnetic field structure of electric machine (101) and the first rotary part of electric machine (104) which relatively revolve, thereby sensing the relative location relation between the shifting magnetic field generated by the first magnetic field winding set of electric machine (102) of the first magnetic field structure of electric machine (101) and the first rotary part of electric machine (104), and sending the sensing signals to the first drive control device (103);

first rotary part of electric machine (104): constituted by magnetic conductive materials, and installed with a rotation shaft, and the coupling surface of the first rotary part of electric machine (104) and the first magnetic field structure of electric machine (101) being provided with a salient pole structure having magnetic conductive feature and having the magnetic poles with the quantity same as or different from that of the first magnetic field structure of electric machine (101), the characteristic is that the magnetic pole of the first rotary part of electric machine (104) being installed with the first serial type auxiliary excitation winding set (105) and the first serial type regulating excitation winding set (305) thereby transmitting the excitation electric power between the mentioned winding set and the exterior through the first electric conduction ring and brush device (107);

first serial type regulating excitation winding set (305): constituted by conductive wires wound on the magnetic pole of the first rotary part of electric machine (104), and transmitting electric power between the mentioned winding set and the exterior through the first electric conduction ring and brush device (107);

first serial type auxiliary excitation winding set (105): constituted by conductive wires wound on the magnetic pole of the first rotary part of electric machine (104), and transmitting the electric power between the mentioned winding set and the exterior through the first electric conduction ring and brush device (107), the installation means include installing the first serial type auxiliary excitation winding set (105) and the first serial type regulating excitation winding set (305), wherein the first serial type auxiliary excitation winding set (105) is leaded to the negative end of the power source through the first electric conduction ring and brush device (107), the other end is connected in series with the second serial type regulating excitation winding set (405) of the second rotary part of electric machine (204) through the first electric conduction ring and brush device (107) and the second electric conduction ring and brush device (207), then leaded to one side of the power source end of the second drive control device (203) of the second magnetic field winding set of electric machine (202) through the second electric conduction ring and brush device (207), then leaded to the positive end of the DC power source through the other side of the power source end of the second drive control device (203);

first electric conduction ring and brush device (107): constituted by the electric conductive ring and the electric conductive brush, served for respectively installed between the revolving rotary part of electric machine and the exterior, so while the rotary part revolving, the electric power is enabled to be transmitted between the first serial type auxiliary excitation winding set (105) and/or the first parallel type auxiliary excitation winding set (108) and the exterior;

With the housing, the bearing or locking screws, the first switched DC electric machine having conduction ring and brush (1001) can be assembled by the mentioned components, wherein the first drive control device (103) can be co-structured with the first switched DC electric machine having conduction ring and brush (1001) or separately provided;

second drive control device (203): constituted by a drive electric control device composed of electromechanical components and/or solid state components and/or microprocessors, served to receive signals from the second electric machine angular position sensor (206), for controlling the timing, the polarity, the phase sequence and the value of voltage and current of the power supply excitation while the second magnetic field winding set of electric machine (202) being operated as a motor, or controlling the timing, the polarity, the phase sequence and the value of voltage and current of outputting electric power while being operated as a power generator; and controlling the voltage, the current and the polarity of the excitation electric power passing the second parallel type auxiliary excitation winding set (208);

second magnetic field structure of electric machine (201): constituted by magnetic conductive iron cores and installed with the second magnetic field winding set of electric machine (202) having two or more phases, coupled to the second rotary part of electric machine (204), the magnetic loop formed by the second magnetic field structure of electric machine (201) and the second rotary part of electric machine (204) allows the shifting magnetic field of the second field winding set of electric machine (202) to pass, thereby generating the electromechanical effect between the second magnetic field structure of electric machine (201) and the second rotary part of electric machine (204);

second magnetic field winding set of electric machine (202): constituted by a winding set installed in the second magnetic field structure of electric machine (201) having two or more phases; controlled by the excitation control of the second drive control device (203) while being operated as a motor, thereby generating shifting magnetic fields, and generating a motor actuation effect with the second rotary part of electric machine (204); while being operated as a power generator, the second magnetic field winding set of electric machine (202) is controlled by the second drive control device (203) thereby controlling the voltage and current of outputting electric power;

second electric machine angular position sensor (206): constituted by an electromechanical type switch, a Hall element or a physical location sensor such as photoelectron or electromagnetic induction, or ultrasonic or electrostatic induction; installed between the second magnetic field structure of electric machine (201) and the second rotary part of electric machine (204) which relatively revolve, thereby sensing the relative location relation between the shifting magnetic field generated by the second magnetic field winding set of electric machine (202) of the second magnetic field structure of electric machine (201) and the second rotary part of electric machine (204), and sending the sensing signals to the second drive control device (203);

second rotary part of electric machine (204): constituted by magnetic conductive materials, and installed with a rotation shaft, and the coupling surface of the second rotary part of electric machine (204) and the second magnetic field structure of electric machine (201) being provided with a salient pole structure having magnetic conductive feature and having the magnetic poles with the quantity same as or different from that of the second magnetic field structure of electric machine (201), the characteristic is that the magnetic pole of the second rotary part of electric machine (204) being installed with the second serial type auxiliary excitation winding set (205) and the second serial type regulating excitation winding set (405) thereby transmitting the excitation electric power between the mentioned winding set and the exterior through the Second electric conduction ring and brush device (207);

second serial type regulating excitation winding set (405): constituted by conductive wires wounded on the magnetic pole of the second rotary part of electric machine (204), and transmitting electric power between the mentioned winding set and the exterior through the second electric conduction ring and brush device (207);

second serial type auxiliary excitation winding set (205): constituted by conductive wires wound on the magnetic pole of the second rotary part of electric machine (204), and transmitting the electric power between the mentioned winding set and the exterior through the second electric conduction ring and brush device (207), the installation means include installing the second serial type auxiliary excitation winding set (205) and the second serial type regulating excitation winding set (405), wherein the second serial type auxiliary excitation winding set (205) is leaded to the negative end of the power source through the second electric conduction ring and brush device (207), the other end is connected in series with the first serial type regulating excitation winding set (305) of the first rotary part of electric machine (104) through the second electric conduction ring and brush device (207) and the first electric conduction ring and brush device (107), then leaded to one side of the power source end of the first drive control device (103) of the first magnetic field winding set of electric machine (102) through the first electric conduction ring and brush device (107), then leaded to the positive end of the DC power source through the other side of the power source end of the first drive control device (103);

second electric conduction ring and brush device (207): constituted by the electric conductive ring and the electric conductive brush, served for respectively installed between the revolving rotary part of electric machine and the exterior, so while the rotary part revolving, the electric power is enabled to be transmitted between the second serial type auxiliary excitation winding set (205) and/or the second parallel type auxiliary excitation winding set (208) and the exterior;

the semi cross-interlocked electric machine system is formed through selecting the excitation polarity of the first serial type auxiliary excitation winding set (105) and the first serial type regulating excitation winding set (305) for auxiliary excitation or differential excitation, and through selecting the excitation polarity of the second serial type auxiliary excitation winding set (205) and the second serial type regulating excitation winding set (405) for auxiliary excitation or differential excitation;

with the housing, the bearing or locking screws, the second switched DC electric machine having conduction ring and brush (1002) can be assembled by the mentioned components, wherein the second drive control device (203) can be co-structured with the second switched DC electric machine having conduction ring and brush (1002) or separately provided.

According to the embodiments disclosed in FIG. 1 and FIG. 4 which adopt the first switched DC electric machine having conduction ring and brush (1001) and the second switched DC electric machine (1002) having conduction ring and brush constituted by the mechanical commutator-less switched DC permanent rotor electric machine with conduction ring and brush having serial excitation winding or the switched DC reluctance rotor electric machine with conduction ring and brush having serial excitation winding as the example of two switched DC electric machines having conduction ring and brush, when being practiced, adjacent serial type auxiliary excitation winding sets of two or more switched DC electric machines having conduction ring and brush can be connected in series at the electric power input end of the drive control device served to drive the magnetic field winding set of electric machine, then leaded to the DC power source, and the serial type auxiliary excitation winding set of the last set of switched DC electric machine having conduction ring and brush is connected in series with the electric power input end of the first drive control device served to drive the first magnetic field winding set of electric machine then leaded to the DC power source, thereby constituting the cross-interlocked switch type DC electric machine having auxiliary excitation winding and conduction ring and brush.

The present invention provides a switch type DC electric machine comprises a first switched DC electric machine and a second switched DC electric machine, wherein the first switched DC electric machine has a first magnetic field structure with a first set of magnetic field windings (102), a first rotary part (rotor) (104), a first electric conduction ring and brush device (107), a first serial type auxiliary excitation winding set (105); characterized in that the first serial type auxiliary excitation winding set (105) wound on the magnetic pole of the first rotary part of electric machine (104) is connected in series with a magnetic field winding set of the second switched DC electric machine through the transmitted electric power of the first electric conduction ring and brush device (107); and wherein the second switched DC electric machine has a second magnetic field structure with a second set of magnetic field windings (202), a second rotary part (rotor) (204), a second electric conduction ring and brush device (207), and a second serial type auxiliary excitation winding set (205); characterized in that the second serial type auxiliary excitation winding set (205) wound on the magnetic pole of the second rotary part of electric machine (204) is connected in series with the magnetic field winding set of the first switched DC electric machine through the transmitted electric power of the second electric conduction ring and brush device (207).

The invention claimed is:

1. A cross-interlocked switch type DC electric machine system having auxiliary excitation winding and conduction ring and brush, said system including a first switched DC electric machine (1001) having conduction ring and brush and a second switched DC electric machine (1002) having conduction ring and brush, comprising:

a first drive control device (103) of the first electric machine (1001): constituted by a drive electric control device arranged to receive signals from a first electric machine angular position sensor (106), for controlling the timing, the polarity, the phase sequence and the value of voltage and current of the power supply excitation when the first magnetic field winding set (102) of a first electric machine is operated as a motor, or controlling the timing, the polarity, the phase sequence and the value of voltage and current of outputting electric power when the first magnetic field winding set of the first electric machine is operated as a power generator;

a first magnetic field structure (101) of the first electric machine (1001): installed with the first magnetic field winding set (102) having two or more phases, coupled to a first rotary part (104) of the first electric machine, the magnetic loop formed by the first magnetic field structure (101) and the first rotary part (104) allowing the shifting magnetic field of the first magnetic field winding set (102) to pass, thereby generating an electromechanical effect between the first magnetic field structure (101) and the first rotary part (104);

the first magnetic field winding set (102): constituted by a winding set installed in the first magnetic field structure (101) having two or more phases; controlled by the excitation control of the first drive control device (103) while being operated as a motor, thereby generating shifting magnetic fields, and generating a motor actuation effect with the first rotary part (104); while being operated as a power generator, the first magnetic field winding set (102)-being controlled by the first drive control device (103), thereby controlling the voltage and current of outputting electric power;

the first electric machine angular position sensor (106): installed between the first magnetic field structure (101) and the first rotary part (104) which relatively revolve, thereby sensing the relative location relation between the shifting magnetic field generated by the first magnetic field winding set (102) of the first magnetic field structure (101) and the first rotary part (104), and sending sensing signals to the first drive control device (103);

the first rotary part (104): constituted by magnetic conductive materials, the first rotary part (104) being provided with a number of magnetic poles that is the same as or different from that of the first magnetic field structure (101), wherein a magnetic pole of the first rotary part (104) is installed with a first serial type auxiliary excitation winding set (105), thereby transmitting the excitation electric power between the mentioned winding set and the exterior through the first electric conduction ring and brush device (107);

the first serial type auxiliary excitation winding set (105): wound on the magnetic pole of the first rotary part (104), and transmitting the electric power between the mentioned winding set and the exterior through the first electric conduction ring and brush device (107), wherein the first serial type auxiliary excitation winding set (105) is connected in series through the output end of the first electric conduction ring and brush device (107) with the electric power input end of a second drive control device (203) of a second magnetic field winding set (202) of a second electric machine, and then connected to the DC power source;

the first electric conduction ring and brush device (107): respectively installed between the revolving rotary part of electric machine and the exterior, so that while the rotary part is revolving, the electric power is enabled to be transmitted between the first serial type auxiliary excitation winding set (105) and the exterior;

a second drive control device (203) of the second electric machine (1002): constituted by a drive electric control device arranged to receive signals from a second electric machine angular position sensor (206), for controlling the timing, the polarity, the phase sequence and the value of voltage and current of the power supply excitation when the second magnetic field winding set (202) of a second electric machine is operated as a motor, or controlling the timing, the polarity, the phase sequence and the value of voltage and current of outputting electric power when the second magnetic field winding set of the second electric machine is operated as a power generator;

a second magnetic field structure (201) of the second electric machine (1002): installed with the second magnetic field winding set (202) having two or more phases, coupled to a second rotary part (204) of the second electric machine, the magnetic loop formed by the second magnetic field structure (201) and the second rotary part (204) allowing the shifting magnetic field of the second magnetic field winding set (202) to pass, thereby generating an electromechanical effect between the second magnetic field structure (201) and the second rotary part (204);

the second magnetic field winding set (202): constituted by a winding set installed in the second magnetic field structure (201) having two or more phases; controlled by the excitation control of the second drive control device (203) while being operated as a motor, thereby generating shifting magnetic fields, and generating a motor actuation effect with the second rotary part (204); while being operated as a power generator, the second magnetic field winding set (202) being controlled by the second drive control device (203), thereby controlling the voltage and current of outputting electric power;

the second electric machine angular position sensor (206): installed between the second magnetic field structure (201) and the second rotary part (204) which relatively revolve, thereby sensing the relative location relation between the shifting magnetic field generated by the second magnetic field winding set (202) of the second magnetic field structure (201) and the second rotary part (204), and sending second sensing signals to the second drive control device (203);

the second rotary part (204): constituted by magnetic conductive materials, the second rotary part (204) being provided with a number of magnetic poles that is the same or different from that of the second magnetic field structure (201), wherein a magnetic pole of the second rotary part (204) is installed with a second serial type auxiliary excitation winding set (205) thereby transmitting the excitation electric power between the mentioned winding set and the exterior through a second electric conduction ring and brush device (207);

the second serial type auxiliary excitation winding set (205): wound on the magnetic pole of the second rotary part (204), and transmitting the electric power between the mentioned winding set and the exterior through the second electric conduction ring and brush device (207), wherein the second serial type auxiliary excitation winding set (205) is connected in series through the output end of the second electric conduction ring and brush device (207) with the electric power input end of the first drive control device (103) of the first magnetic field winding set (102), and then connected to the DC power source;

the second electric conduction ring and brush device (207): respectively installed between the revolving rotary part of the second electric machine and the exterior, so while the rotary part is revolving, the electric power is enabled to be transmitted between the second serial type auxiliary excitation winding set (205) and the exterior.

2. A cross-interlocked switch type DC electric machine system having auxiliary excitation winding and conduction ring and brush as claimed in claim 1, further comprising a first parallel type auxiliary excitation winding set (108) and a second parallel type auxiliary excitation winding set (208), wherein the first drive control device (103) controls the voltage, the current and the polarity of excitation electric power passing the first parallel type auxiliary excitation winding set (108);

wherein the first parallel type auxiliary excitation winding set (108) is connected in parallel with the DC power source or the output end of the first drive control device (103) or two ends of the first magnetic field winding set (102);

wherein the first electric conduction ring and brush device (107) enables the electric power to be transmitted between the first parallel type auxiliary excitation winding set (108) and the exterior;

wherein second drive control device (203) controls the voltage, the current and the polarity of the excitation electric power passing the second parallel type auxiliary excitation winding set (208);

wherein the second parallel type auxiliary excitation winding set (208) is connected in parallel with the DC power source or the output end of the second drive control device (203) or two ends of the second magnetic field winding set of electric machine (202); and wherein the second electric conduction ring and brush device (207) enables the electric power to be transmitted between the second parallel type auxiliary excitation winding set (208) and the exterior.

3. A cross-interlocked switch type DC electric machine system having auxiliary excitation winding and conduction ring and brush as claimed in claim 1, wherein the cross-interlocked multi-phase switched DC electric machine system having conduction ring and brush is installed with the first serial type auxiliary excitation winding set (105), the permanent magnetic pole (301) of a first rotary part of the first electric machine, the second serial type auxiliary excitation winding set (205), and the permanent magnetic pole (401) of the second rotary part of a second electric machine, wherein the first serial type auxiliary excitation winding set (105) and the permanent magnetic pole (301) of the first rotary part are installed at a same polarity for auxiliary excitation or at different polarities for differential excitation, and wherein the second serial type auxiliary excitation winding set (205) and the permanent magnetic pole (401) of second rotary part are installed at the same polarity for auxiliary excitation or at different polarities for differential excitation.

4. A cross-interlocked switch type DC electric machine system having auxiliary excitation winding and conduction ring and brush as claimed in claim 1, further comprising:

a first serial type regulating excitation winding set (305): wound on the magnetic pole of the first rotary part (104), and transmitting electric power between the first serial type regulating excitation winding set and the exterior through the first electric conduction ring and brush device (107), wherein one end of the first serial type auxiliary excitation winding set (105) is connected to the negative end of the power source through the first electric conduction ring and brush device (107), and the other end of the first serial type auxiliary excitation winding set (105) is connected in series with the second serial type regulating excitation winding set (405) of the second rotary part (204) through the first electric conduction ring and brush device (107) and the second electric conduction ring and brush device (207), then connected to one side of the power source end of the second drive control device (203) of the second magnetic field winding set (202) through the second electric conduction ring and brush device (207), and then connected to the positive end of the DC power source through the other side of the power source end of the second drive control device (203), wherein the first electric conduction ring and brush device (107) is installed between the revolving rotary part and the exterior, so that while the rotary part is rotating, electric power is transmitted between the first serial type auxiliary excitation winding set (105) and/or the first parallel type auxiliary excitation winding set (108) and the exterior, wherein a second serial type regulating excitation winding set (405) is wound on the magnetic pole of the second rotary part (204), and transmitting electric power between the second serial type regulating excitation winding set and the exterior through the second electric conduction ring and brush device (207), wherein one end of the second serial type auxiliary excitation winding set (205) is connected to the negative end of the power source through the second electric conduction ring and brush device (207), the other end of the second serial type auxiliary excitation winding set (205) is connected in series with the first serial type regulating excitation winding set (305) of the first rotary part (104) through the second electric conduction ring and brush device (207) and the first electric conduction ring and brush device (107), then connected to one side of the power source end of the first drive control device (103) of the first magnetic field winding set (102) through the first electric conduction ring and brush device (107), and then connected to the positive end of the DC power source through the other side of the power source end of the first drive control device (103), wherein the second electric conduction ring and brush device (207) is installed between the revolving rotary part and the exterior, so that while the rotary part is revolving, the electric power is-transmitted between the second serial type auxiliary excitation winding set (205) and/or the second parallel type auxiliary excitation winding set (208) and the exterior, and wherein the semi cross-interlocked electric machine system is formed by selecting the excitation polarity of the first serial type auxiliary excitation winding set (105) and the first serial type regulating excitation winding set (305) for auxiliary excitation or differential excitation, and by selecting the excitation polarity of the second serial type auxiliary excitation winding set (205) and the second serial type regulating excitation winding set (405) for auxiliary excitation or differential excitation.

5. A cross-interlocked switch type DC electric machine system having auxiliary excitation winding and conduction ring and brush as claimed in any of claims 1~4, wherein adjacent serial type auxiliary excitation winding sets of two or more switched DC electric machines are connected in series at the electric power input end of the drive control device served to drive the magnetic field winding sets of electric machines, and then connected to the DC power source, and wherein the serial type auxiliary excitation winding set of the last set of switched DC electric machine is connected in series with the electric power input end of the first drive control device served to drive the first magnetic field winding set of electric machine and then connected to the DC power source, thereby constituting the cross-interlocked switch type DC electric machine system having auxiliary excitation winding and conduction ring and brush.

6. A cross-interlocked switch type DC electric machine system having auxiliary excitation winding and conduction ring and brush as claimed in claim 2, further comprising:
- a first serial type regulating excitation winding set (305):
  - wound on the magnetic pole of the first rotary part (104), and transmitting electric power between the first serial type regulating excitation winding set and the exterior through the first electric conduction ring and brush device (107),
  - wherein one end of the first serial type auxiliary excitation winding set (105) is connected to the negative end of the power source through the first electric conduction ring and brush device (107), and the other end of the first serial type auxiliary excitation winding set (105) is connected in series with the second serial type regulating excitation winding set (405) of the second rotary part (204) through the first electric conduction ring and brush device (107) and the second electric conduction ring and brush device (207), then connected to one side of the power source end of the second drive control device (203) of the second magnetic field winding set (202) through the second electric conduction ring and brush device (207), and then connected to the positive end of the DC power source through the other side of the power source end of the second drive control device (203),
  - wherein the first electric conduction ring and brush device (107) is installed between the revolving rotary part and the exterior, so that while the rotary part is rotating, electric power is transmitted between the first serial type auxiliary excitation winding set (105) and/or the first parallel type auxiliary excitation winding set (108) and the exterior,
  - wherein a second serial type regulating excitation winding set (405) is wound on the magnetic pole of the second rotary part (204), and transmitting electric power between the second serial type regulating excitation winding set and the exterior through the second electric conduction ring and brush device (207),
  - wherein one end of the second serial type auxiliary excitation winding set (205) is connected to the negative end of the power source through the second electric conduction ring and brush device (207), the other end of the second serial type auxiliary excitation winding set (205) is connected in series with the first serial type regulating excitation winding set (305) of the first rotary part (104) through the second electric conduction ring and brush device (207) and the first electric conduction ring and brush device (107), then connected to one side of the power source end of the first drive control device (103) of the first magnetic field winding set (102) through the first electric conduction ring and brush device (107), and then connected to the positive end of the DC power source through the other side of the power source end of the first drive control device (103),
  - wherein the second electric conduction ring and brush device (207) is installed between the revolving rotary part and the exterior, so that while the rotary part is revolving, the electric power is transmitted between the second serial type auxiliary excitation winding set (205) and/or the second parallel type auxiliary excitation winding set (208) and the exterior, and
  - wherein the semi cross-interlocked electric machine system is formed by selecting the excitation polarity of the first serial type auxiliary excitation winding set (105) and the first serial type regulating excitation winding set (305) for auxiliary excitation or differential excitation, and by selecting the excitation polarity of the second serial type auxiliary excitation winding set (205) and the second serial type regulating excitation winding set (405) for auxiliary excitation or differential excitation.

7. A cross-interlocked switch type DC electric machine system having auxiliary excitation winding and conduction ring and brush as claimed in claim 6, wherein adjacent serial type auxiliary excitation winding sets of two or more switched DC electric machines are connected in series at the electric power input end of the drive control device served to drive the magnetic field winding sets of electric machines, and then connected to the DC power source, and wherein the serial type auxiliary excitation winding set of the last set of switched DC electric machine is connected in series with the electric power input end of the first drive control device served to drive the first magnetic field winding set of electric machine and then connected to the DC power source, thereby constituting the cross-interlocked switch type DC electric machine system having auxiliary excitation winding and conduction ring and brush.

* * * * *